US012437738B2

(12) United States Patent
Katoh et al.

(10) Patent No.: US 12,437,738 B2
(45) Date of Patent: Oct. 7, 2025

(54) CASE AND KEYBOARD INSTRUMENT

(71) Applicant: CASIO COMPUTER CO., LTD., Tokyo (JP)

(72) Inventors: Hirokatsu Katoh, Kawasaki (JP); Takahiro Moriya, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 264 days.

(21) Appl. No.: 18/125,414

(22) Filed: Mar. 23, 2023

(65) Prior Publication Data

US 2023/0306939 A1 Sep. 28, 2023

(30) Foreign Application Priority Data

Mar. 24, 2022 (JP) ................................ 2022-048490

(51) Int. Cl.
*G10H 1/34* (2006.01)

(52) U.S. Cl.
CPC .................................... *G10H 1/34* (2013.01)

(58) Field of Classification Search
CPC ....................................................... G10H 1/34
See application file for complete search history.

(56) References Cited

U.S. PATENT DOCUMENTS

| | | | | |
|---|---|---|---|---|
| 12,185,041 B2 * | 12/2024 | Akai | G10H 1/32 | |
| 2008/0163740 A1 * | 7/2008 | Nonaka | G10H 1/34 | |
| | | | 84/423 R | |
| 2017/0206878 A1 * | 7/2017 | Hoshino | H04R 1/24 | |
| 2022/0270577 A1 * | 8/2022 | Nakajima | H04R 1/2803 | |
| 2023/0306939 A1 * | 9/2023 | Katoh | G10H 1/34 | |
| 2024/0428762 A1 * | 12/2024 | Nakajima | G10C 3/02 | |

FOREIGN PATENT DOCUMENTS

| | | | | |
|---|---|---|---|---|
| CN | 110675842 A | 1/2020 | | |
| FR | 3100366 A1 * | 3/2021 | G10H 1/047 | |
| JP | H0790817 A | 4/1995 | | |
| JP | 2000276167 A | 10/2000 | | |
| JP | 2008076722 A | 4/2008 | | |
| JP | 2010009077 A | 1/2010 | | |
| JP | 2011070109 A | 4/2011 | | |
| JP | 2015060112 A | 3/2015 | | |
| JP | 2020016670 A | 1/2020 | | |
| JP | 6667136 B2 * | 3/2020 | G10H 1/32 | |

OTHER PUBLICATIONS

Extended European Search Report dated Jul. 26, 2023 received in European Patent Application No. EP 23163106.0.

* cited by examiner

*Primary Examiner* — Robert W Horn
(74) *Attorney, Agent, or Firm* — SCULLY SCOTT MURPHY & PRESSER, PC

(57) ABSTRACT

A case of a keyboard instrument includes a lower case formed from a resin material which is a first material and extended long in a left-right direction which is a first direction, plural reinforcement members (a first reinforcement member, a second reinforcement member) fixed to the lower case, made from a sheet of steel which is a second material whose linear expansion coefficient is smaller than a linear expansion coefficient of the first material, and disposed to be divided in the left-right direction, a front case formed in such a manner as to extend long in the first direction and fixed to each of the plural reinforcement members, and side cases (a left side case, a right side case) disposed adjacent to the front case and fixed to ends of the reinforcement members.

15 Claims, 11 Drawing Sheets

CASE AND KEYBOARD INSTRUMENT

CROSS-REFERENCE TO RELATED APPLICATION

This patent application is based upon and claims the benefit of priority under 35 USC 119 to Japanese Patent Application No. 2022-048490 filed on Mar. 24, 2022, the entire disclosure of which, including the specification, claims, drawings and abstract, is incorporated herein by reference in its entirety.

BACKGROUND OF THE INVENTION

Technical Field

The present disclosure relates to a case and a keyboard instrument.

Description of the Related Art

There have conventionally been disclosed cases which are made up of assembled members of different materials. For example, Patent Literature 1 discloses a keyboard instrument comprising a case having an upper case which consists of a front panel, which is an extruded panel of an aluminum material, and a back panel, which is a sheet metal member of an iron-based material. A reinforcement member is provided in such a manner as to span the front panel and the back panel, thereby realizing an integral construction of the upper case.

SUMMARY OF THE INVENTION

According to an aspect of the present disclosure, there is provided a case including a lower case made of a first material and extended long in a first direction, plural reinforcement members fixed to the lower case, made of a second material having a smaller linear expansion coefficient than a linear expansion coefficient of the first material, and disposed to be divided along the first direction, a front case formed in such a manner as to be long in the first direction and fixed to each of the plural reinforcement members, and side cases disposed adjacent to the front case and fixed individually to ends of the plural reinforcement members.

According to the other aspect of the present disclosure, there is provided a keyboard instrument including the case described above.

DESCRIPTION OF THE EMBODIMENT

Figure 1:
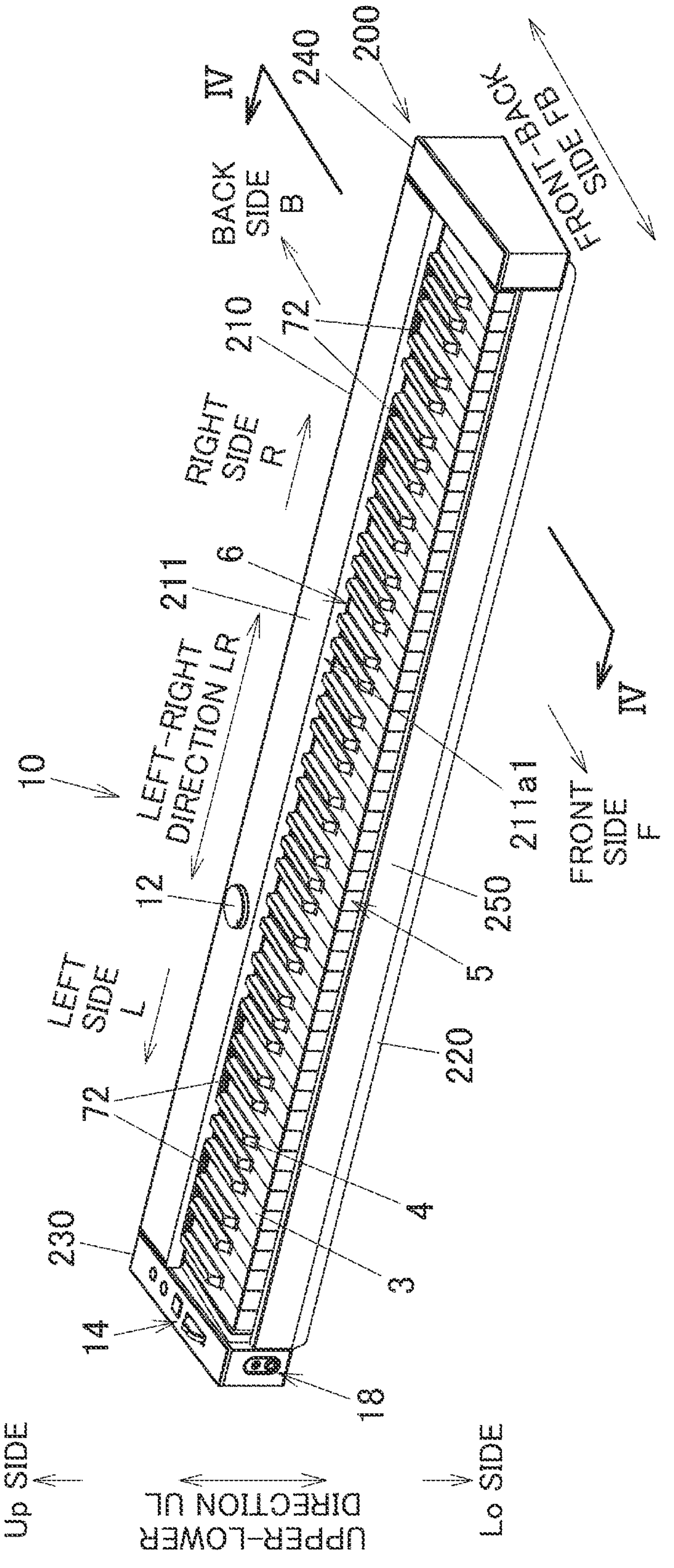
FIG. 1 is a perspective view showing a keyboard instrument according to an embodiment of the present disclosure.

Hereinafter, an embodiment of the present disclosure will be described based on drawings. A keyboard instrument 10 shown in FIG. 1 includes a full-scale (88-note) keyboard 5 including plural white keys 3 and plural black keys 4, which make up a large number of keys or 88 keys of the keyboard 5, and a case 200. In the following description, a front to the keys in the keyboard 5 in a front-back direction FB is referred to as a front side F, and a back to the keys in the keyboard 5 in the front-back direction FB is referred to as a back side B. When facing the keyboard 5 from the front side F, a left of the keyboard 5 is referred to as a left side L, and a right of the keyboard 5 is referred to as a right side R. In the keyboard 5, the keys are aligned in a left-right direction LR. When viewing the keyboard instrument 10 in an upper-lower direction UL thereof, an upper side is referred to as an upper side Up, and a lower side is referred to as a lower side Lo. In the embodiment, while the keyboard instrument 10 is described as an electronic keyboard instrument, the keyboard instrument 10 may take other forms. In addition, the case 200 is not limited to a case for the keyboard instrument 10 but may be a case 200 for other devices.

As shown in FIG. 1, the case 200 has an upper case 210, a lower case 220, a left side case 230 and a right side case 240 as side cases, and a front case 250. The upper case 210, the lower case 220, and the front case 250 are provided in such a manner as to be long in the left-right direction LR, which is one of the directions relating to the keyboard instrument 10. The upper case 210 has an upper panel 211 and a back panel (not shown). The left side case 230 and the right side case 240, which each have substantially a rectangular shape elongated in the front-back direction FB, are disposed adjacent to left and right end portions of the upper case 210 and the front case 250, respectively. The lower case 220 is provided on lower sides Lo of the upper case 210 and the side cases (the left side case 30, the right side case 240).

A keyboard installation portion 6 where to install the keyboard 5 is provided at a front side F of the upper case 210 and between the left side case 230 and the right side case 240. The front case 250, having substantially a plate-like shape elongated in the left-right direction LR, is provided at the front side F of the keyboard 5 and between the left side case 230 and the right side case 240.

A rotary knob 12, which is configured to control the volume of the keyboard instrument 10, is provided on the upper panel 211 of the upper case 210. A control section 14, which includes a pitch modulator, push buttons, and the like, is provided on an upper surface of the left side case 230. In addition, an earphone jack 18 is provide in a front surface of the left side case 230.

Figures 2A, 2B, 2C, 2D, 2E:
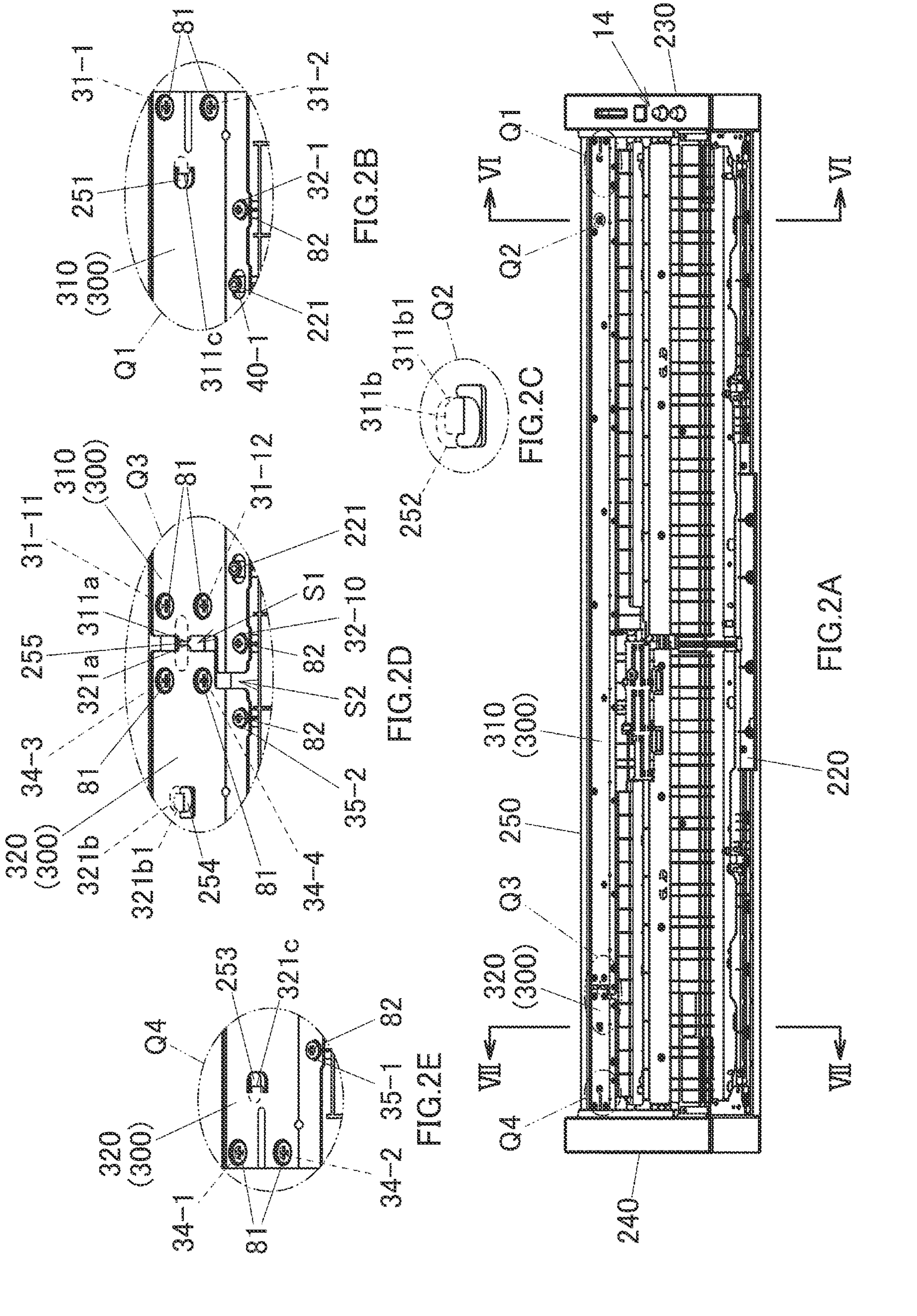
FIGS. 2A to 2E are perspective views of a case according to the embodiment of the present disclosure, as viewed from a back side thereof, which show individually states in which side cases, a lower case, a front case, and reinforcement members of the case are assembled together.

Hereinafter, connecting structures between the lower case 220 and the front case 250 and between the front case 250 and the side cases (the left side case 230, the right side case 240) will be described in detail. FIG. 2A shows a state, as viewed from a back side B of the keyboard instrument 10, in which the lower case 220, the side cases (the left side case 230, the right side case 240), and the front case 250 are assembled together by being connected together by a reinforcement member 300. The reinforcement member 300 is divided into plural members, and the front case 250 is fixed to the reinforcement member 300 while spanning the reinforcement member 300. In the present embodiment, the reinforcement member 300 is divided into a first reinforcement member 310 and a second reinforcement member 320, whereby the first reinforcement member 310 is provided on the left side L, while the second reinforcement member 320 is provided on the right side R. That is, in the present embodiment, the first reinforcement member 310 and the second reinforcement member 320 are the reinforcement members 300 of the plural reinforcement members 300 which are disposed at end portions in the left-right direction LR. Additionally, the first reinforcement member 310 is provided in such a manner as to be longer than the second reinforcement member 320, as a result of which the reinforcement member 300 is divided asymmetrically.

The lower case 220 is formed from a resin material, which constitutes a first material, through injection molding. The reinforcement members 300 (the first reinforcement member 310, the second reinforcement member 320) are formed from a sheet of steel, which constitutes a second material, through sheet metal work. A linear expansion coefficient of the second material is smaller than a linear expansion coefficient of the first material. Additionally, the front case 250 is made up of a wood member, which constitutes a third material.

Figure 3:
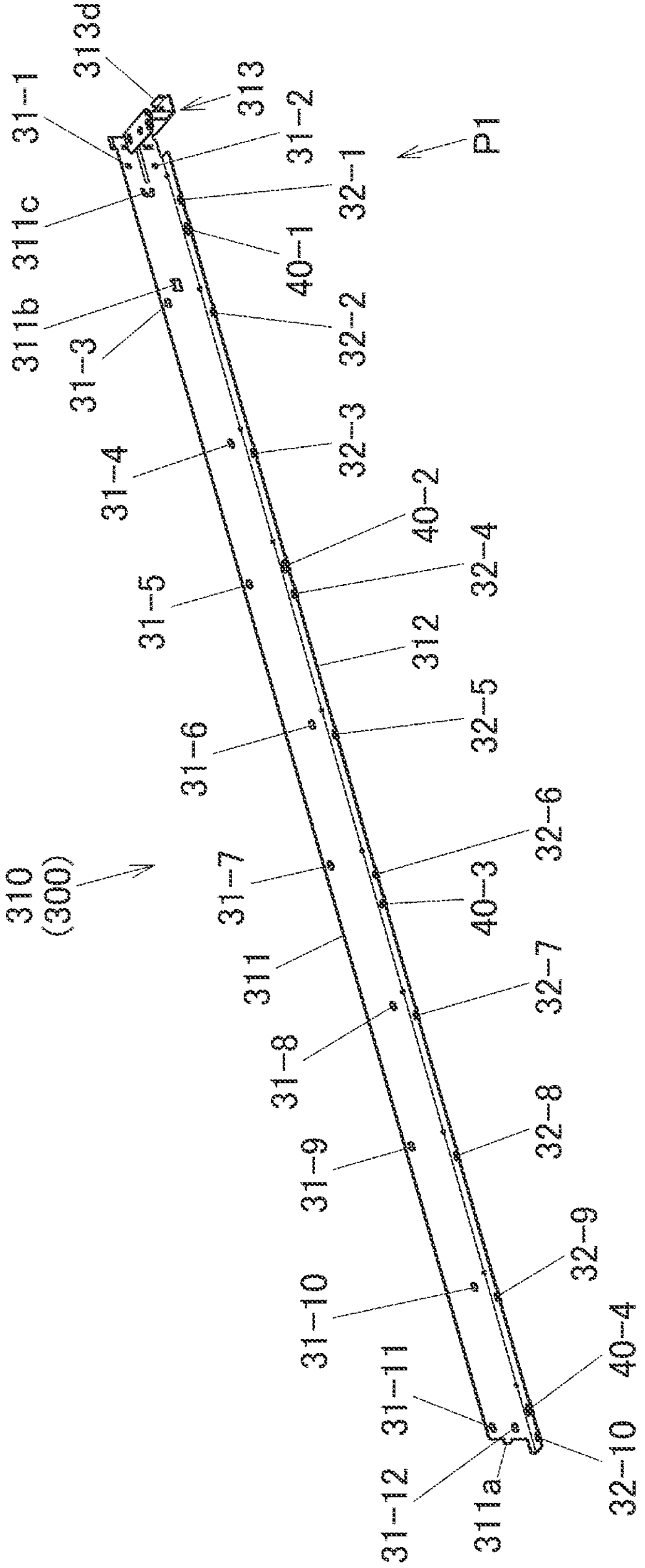
FIG. 3 is a perspective view showing a first reinforcement member according to the embodiment of the present disclosure.

As shown in FIG. 3, the first reinforcement member 310 has substantially an L-shape in section and is provided in such a manner as to be long in the left-right direction LR. The first reinforcement member 310 includes a front plate 311 and a lower plate 312. The front plate 311 has substantially the same width as a width in the upper-lower direction UL (a width direction) of the front case 250, and the lower plate 312 is bent towards the back side B from a lower edge of the front plate 311 and is made sufficiently narrower in width than the front plate 311. An engagement piece 311*a* (a first projecting portion) is provided at a right end of the front plate 311. The engagement piece 311*a* is bent towards the front side F into a shape of a tongue piece with plate surfaces thereof made to face the left-right direction LR. A right end of the lower plate 312 projects further in the direction of the right side R than the right end of the front plate 311.

Figure 4B:
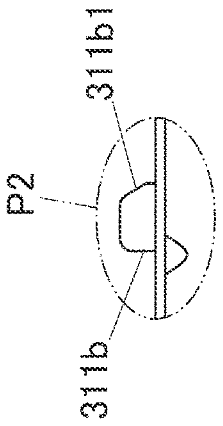
FIGS. 4A and 4B are partial enlarged perspective views of the first reinforcement member according to the embodiment of the present disclosure, which is viewed from a direction P1 shown in FIG. 3.
Figure 4A:
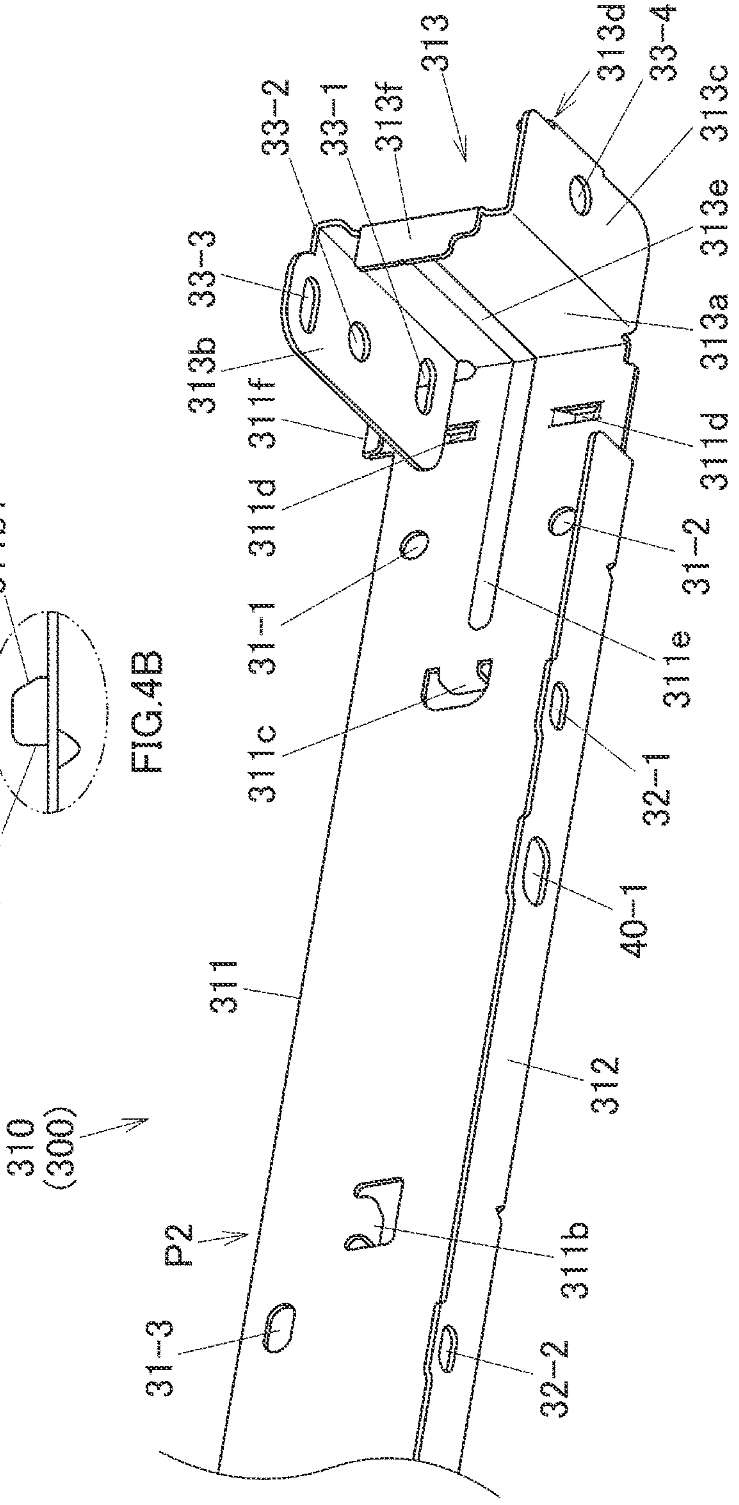

As shown in FIGS. 4A and 4B, engagement pieces 311*b*, 311*c*, each having a shape of a tongue piece, are provided at two locations in the vicinity of a left side L end portion of the front plate 311. Of the two tongue piece-shaped engagement pieces 311*b*, 311*c*, the inner (right side R) engagement piece 311*b* (a second projecting portion) is bent towards the front side F with plate surfaces thereof made to face the upper-lower direction UL. As shown in a circled view P2 of FIG. 4B, the engagement piece 311*b* is formed substantially into a rectangular shape including an inclined side or portion 311*b*1 which is formed by gradually inclining an outer side (a side facing the left side case 230 at the left side L) in such a manner that a projecting end side gets narrower in width. Of the two tongue piece-shaped engagement pieces 311*b*, 311*c*, the outer (left side L) engagement piece 311*c* (a first projecting portion) is bent towards the front side F with plate surfaces thereof made to face the left-right direction LR. The engagement piece 311*c* is formed substantially into a rectangular shape.

Figure 10:
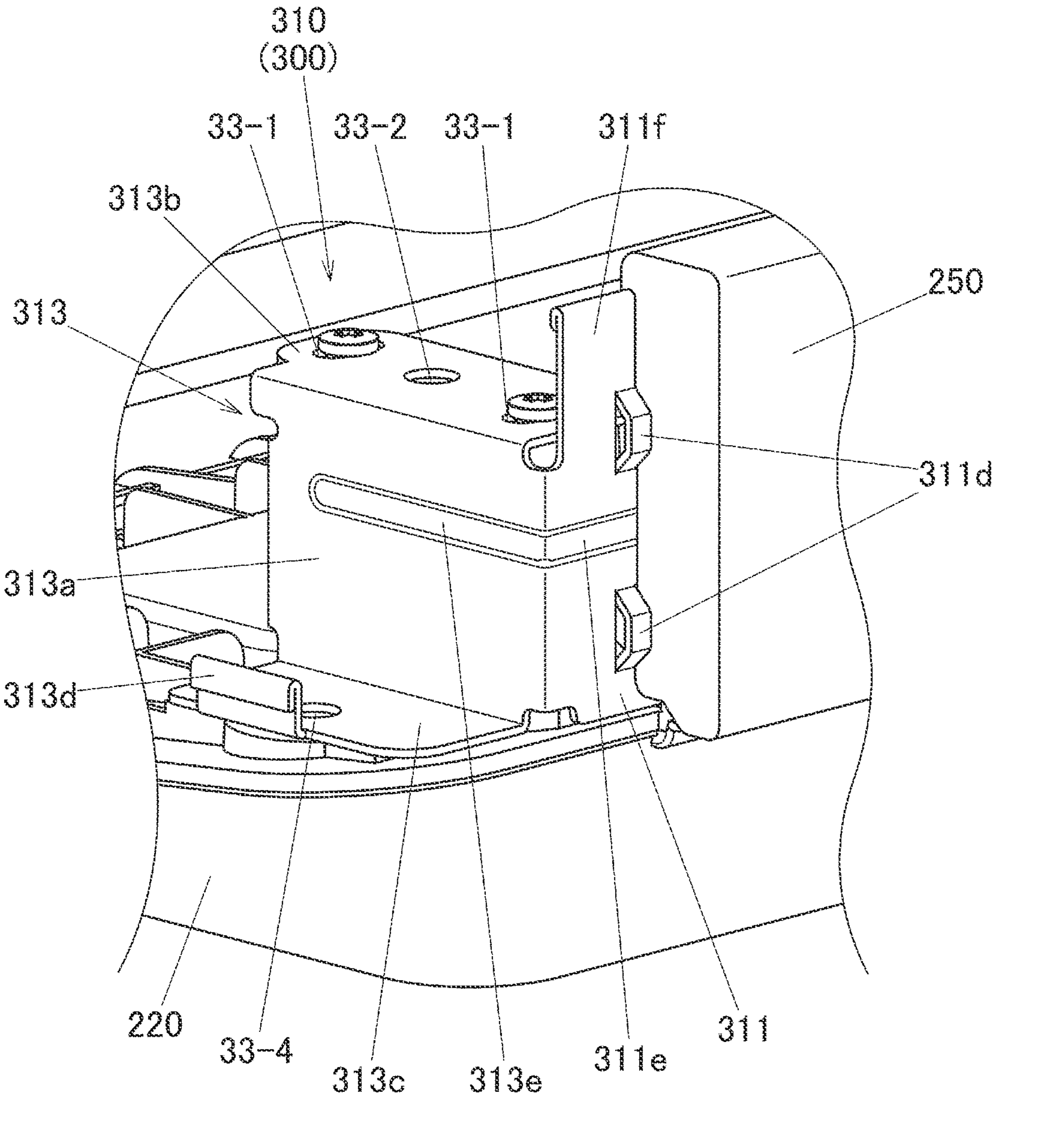
FIG. 10 is a perspective view of a left side portion of the case according to the embodiment of the present disclosure with a left side case omitted from illustration.

Two projections 311*d* (abutment projections), which are aligned vertically, are provided at the left end portion of the front plate 311 (also refer to FIG. 10). A recessed groove portion 311*e* is provided between the two projections 311*d* in such a manner as to extend from the left side L end portion of the front plate 311 towards the right side R, whereby the left end portion of the front plate 311 is reinforced. The recessed groove portion 311*e* is recessed from a surface of the front plate 311 which faces the front side F. In addition, a projecting piece 311*f* is provided at the left side L end portion of the front plate 311 in such a manner as to project upwards therefrom (towards an upper side Up of the projection 311*d*) with plate surfaces made to face the front-back direction FB.

A fixing portion 313 is provided at the left side L end portion of the front plate 311. The fixing portion 313 is bent towards the back side B from the left side L end portion of the front plate 311. The fixing portion 313 includes a vertical plate 313*a*, which is disposed in such a manner that plate surfaces thereof are made to face in the left-right direction LR, an upper horizontal plate 313*b*, which is bent from an upper end of the vertical plate 313*a* towards the right side R and is disposed in such a manner that plate surfaces thereof are made to face in the upper-lower direction UL, and a lower horizontal plate 313*c*, which is bent from a lower end of the vertical plate 313*a* towards the left side L and is disposed in such a manner that plate surfaces thereof are made to face in the upper-lower direction UL. A recessed groove portion 313*e* is provided on the vertical plate 313*a* in such a manner as to continuously connect to the recessed groove portion 311*e* of the front plate 311. A bent portion 313*f* is provided at a back side B of the vertical plate 313*a* in such a manner as to be bent substantially at right angles towards the right side R. A projecting piece 313*d* is provided on the lower horizontal plate 313*c* in such a manner as to be bent substantially at right angles towards the upper side Up (also refer to FIG. 3). A distal end treatment is applied to both the projecting pieces 311*f*, 313*d*, whereby distal end portions thereof are folded up.

Plural (12 in the present embodiment) screw holes 31-1 to 31-12 are provided in the front plate 311 so that screw members 81 (refer to FIGS. 2B, 2D, 2E) are passed therethrough to fix the front plate 311 to the front case 250. Plural (10 in the present embodiment) screw holes 32-1 to 32-10 are provided in the lower plate 312 so that screw members 82 are passed therethrough to fix the lower plate 312 to the lower case 220. Back side B edge portions of the lower plate 312 which correspond to the screw holes 32-1 to 32-10 and hole portions 40-1 to 40-4, which will be described later, in the lower plate 312 project slightly towards the back side B.

In the two screw holes 31-1 to 31-12, the two screw holes 31-1, 31-2 are provided at the left side L end portion of the front plate 311 in such a manner as to be disposed vertically while holding the recessed groove portion 311*e* therebetween. On the other hand, the two screw holes 31-11, 31-12 are provided at a right side R end portion of the front plate 311 in such a manner as to be disposed vertically. The screw holes 31-3 to 31-10 lying between the screw holes 31-1, 31-2, 31-11, 31-12 at the left and right end portions are disposed substantially at equal intervals along a longitudinal direction of the front plate 311 while being disposed in upper and lower positions alternately. In the plural screw holes 31-1 to 31-12 which are provided in the front plate 311, the screw holes 31-1, 31-2 at the left side L end portion are formed as circular holes. The remaining screw holes 31-3 to 31-12 are formed as elongate holes which are elongated in the left-right direction LR. The screw holes 31-3 to 31-12, which are the elongate holes, have the same elongate shape.

The screw holes 32-1 to 32-10 provided in the lower plate 312 are all elongate holes which are elongated in the left-right direction LR. The elongate screw hole 32-6 situated substantially at a central portion in the left-right direction LR of the front case 250 and the lower case 220 is made shorter in longitudinal length than the other elongate screw holes 32-1 to 32-5 and 32-7 to 32-10.

In addition, a pin 221 set upright from the lower case 220 is passed through each of the four hole portions 40-1 to 40-4 provided in the lower plate 312 (refer to a view (FIG. 2B) of a circled portion Q1 in FIG. 2A). The hole portion 40-3 situated substantially at a central portion in the left-right direction LR of the front case 250 and the lower case 220 is formed into a circular hole, and the other hole portions 40-1, 40-2, 40-4 are formed into elongate holes. The engagement of the hole portions 40-1 to 40-4 with the corresponding pins 221 restricts a movement of the first reinforcement member 310 in the front-back direction FB to thereby position the first reinforcement member 310 in the relevant direction, while allowing the first reinforcement member 310 to move in the left-right direction LR.

Three screw holes 33-1 to 33-3 are provided in the upper horizontal plate 313*b* of the fixing portion 313 in such a manner as to be aligned in the front-back direction FB. The front and back screw holes 33-1, 33-3 are formed into elongate holes which are elongated in the left-right direction LR. The screw hole 33-2 lying between the front and back screw holes 33-1, 33-3 is formed into a circular hole. A screw hole 33-4 is provided in the lower horizontal plate 313*c* of the fixing portion 313 and is formed into a circular hole.

Figures 5A, 5B:
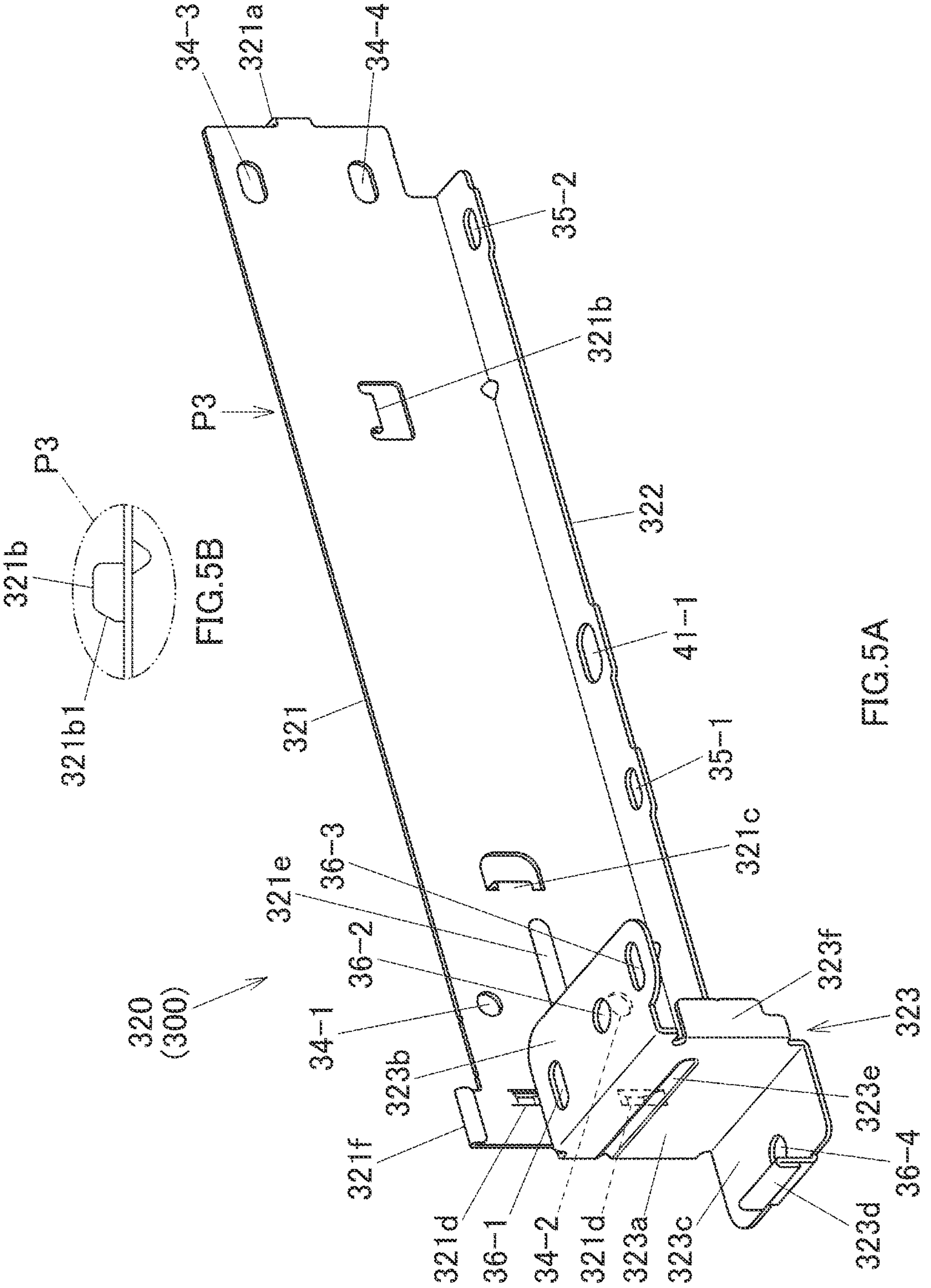
FIGS. 5A and 5B are perspective views showing a second reinforcement member of the case according to the embodiment of the present disclosure.

As shown in FIGS. 5A and 5B, the second reinforcement member 320 has substantially an L-shape in section and is provided in such a manner as to extend long in the left-right direction LR. The second reinforcement member 320 is provided sufficiently shorter in length in the left-right direction LR than the first reinforcement member 310. The second reinforcement member 320 includes a front plate 321 and a lower plate 322. The front plate 321 has substantially the same width as a width in the upper-lower direction UL (a width direction) of the front case 250, and the lower plate 322 is bent towards the back side B from a lower edge of the front plate 321 and is made sufficiently narrower in width than the front plate 321. An engagement piece 321*a* (a first projecting portion) is provided at a left end of the front plate 321. The engagement piece 321*a* is bent towards the front side F into a shape of a tongue piece with plate surfaces thereof made to face the left-right direction LR.

An engagement piece 321*b* having a shape of a tongue piece is provided closer to the left side L than a center of the front plate 321, and an engagement piece 321*c* having a shape of a tongue piece is provided closer to the right side R than the center of the front plate 321. The engagement piece 321*b* (a second projecting portion) is bent towards the front side F with plate surfaces thereof made to face the upper-lower direction UL. As shown in a view (FIG. 5B) of a circled portion P3, the engagement piece 321*b* is formed substantially into a rectangular shape including an inclined side or portion 321*b*1 which is formed by gradually inclining an outer side (a side facing the right side case 240 at the right side R) in such a manner that a projecting end side gets narrower in width. The engagement piece 321*c* (a first projecting portion) is bent towards the front side F with plate surfaces thereof made to face the left-right direction LR. The engagement piece 321*c* is formed substantially into a rectangular shape.

Figure 11:
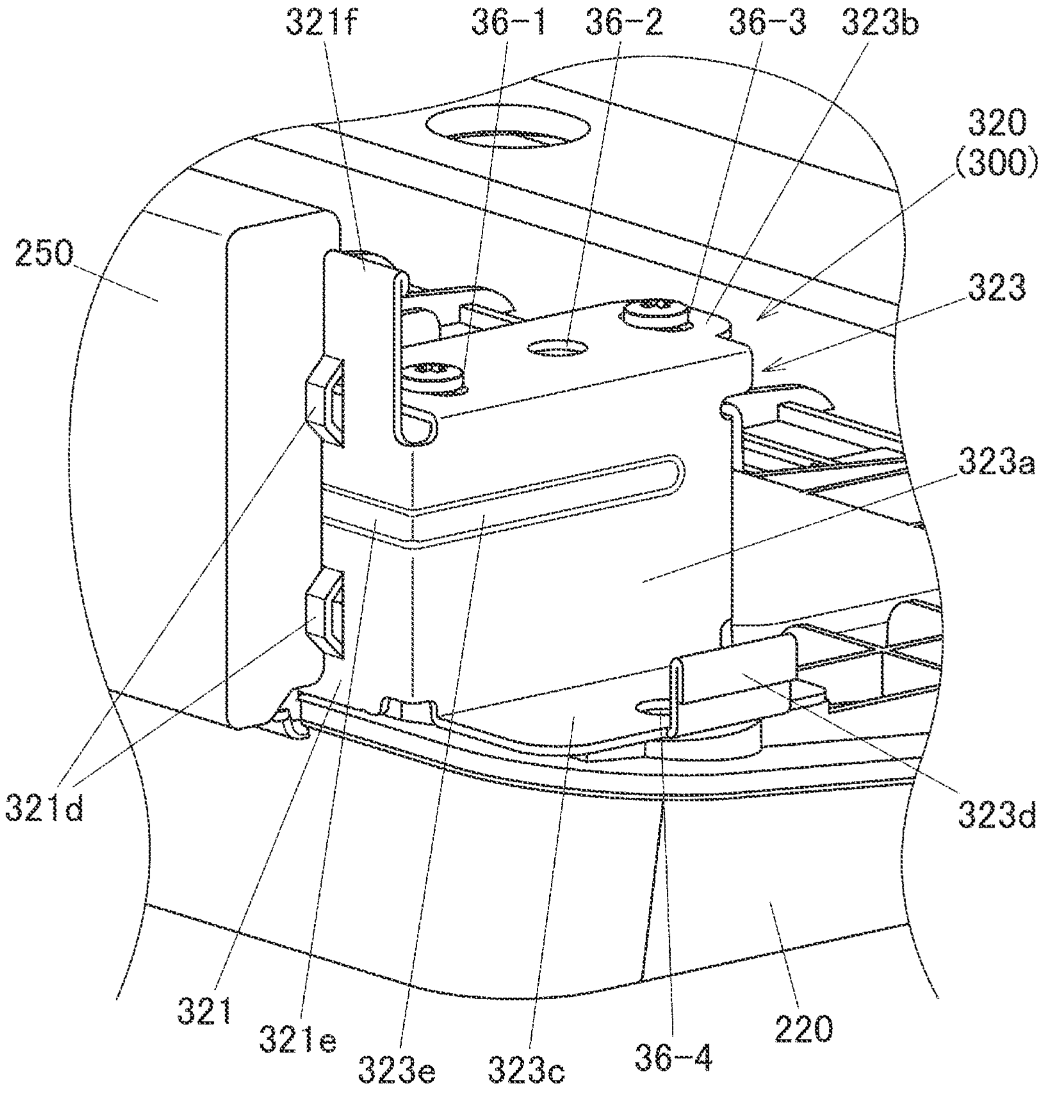
FIG. 11 is a perspective view of a right side portion of the case according to the embodiment of the present disclosure with a right side case omitted from illustration.

Two projections 321*d* (abutment projections), which are aligned vertically, are provided at a right end portion of the front plate 321 (also refer to FIG. 11). A recessed groove portion 321*e* is provided between the two projections 321*d* in such a manner as to extend in the left-right direction LR for reinforcement of the right end portion of the front plate 321. The recessed groove portion 321*e* is recessed from a surface of the front plate 321 which faces the front side F. In addition, a projecting piece 321*f* is provided at the right side R end portion of the front plate 321 in such a manner as to project upwards therefrom (towards an upper side Up of the projection 321*d*) with plate surfaces thereof made to face the front-back direction FB.

A fixing portion 323 is provided at the right side R end portion of the front plate 321. The fixing portion 323 is bent towards the back side B from the right side R end portion of the front plate 321. The fixing portion 323 includes a vertical plate 323*a*, which is disposed in such a manner that plate surfaces thereof are made to face in the left-right direction LR, an upper horizontal plate 323*b*, which is bent from an upper end of the vertical plate 323*a* towards the left side L and is disposed in such a manner that plate surfaces thereof are made to face in the upper-lower direction UL, and a lower horizontal plate 323*c*, which is bent from a lower end of the vertical plate 323*a* towards the right side R and is disposed in such a manner that plate surfaces thereof are made to face in the upper-lower direction UL. A recessed groove portion 323*e* is provided on the vertical plate 323*a* in such a manner as to extend in the front-back direction FB to thereby connect to the recessed groove portion 321*e* of the front plate 321 continuously. A bent portion 323*f* is provided at a back side B of the vertical plate 323*a* in such a manner as to be bent towards the left side L. A projecting piece 323*d* is provided on the lower horizontal plate 323*c* in such a manner as to be bent towards the upper side Up while being disposed with plate surfaces thereof made to face the left-right direction LR. A distal end treatment is applied to both the projecting pieces 321*f*, 323*d*, whereby distal end portions thereof are folded up.

Plural (four in the present embodiment) screw holes 34-1 to 34-4 are provided in the front plate 321 so that screw members 81 are passed therethrough to fix the front plate 321 to the front case 250. Plural (two in the present embodiment) screw holes 35-1 and 35-2 are provided in the lower plate 322 so that screw members 82 are passed therethrough to fix the lower plate 322 to the lower case 220. Back side B edge portions of the lower plate 322 which correspond to the screw holes 35-1 and 35-2 and a hole portion 41-1, which will be described later, in the lower plate 322 project slightly towards the back side B.

In the screw holes 34-1 to 34-4, the two screw holes 34-1, 34-2 are provided at the right side R end portion of the front plate 321 in such a manner as to be disposed vertically while holding the recessed groove portion 321*e* therebetween. On the other hand, the two screw holes 34-3, 34-3 are provided at a left side L end portion of the front plate 321 in such a manner as to be disposed vertically. In the screw holes 34-1 to 34-4 provided in the front plate 321, the screw holes 34-1, 34-2 on the right side R are formed into circular holes, while the screw holes 34-3, 34-4 on the left side L are formed into elongate holes which are elongated in the left-right direction LR.

The screw holes 35-1 and 35-2 which are provided in the lower plate 322 are both elongate holes which are elongated in the left-right direction LR. A pin 221 set upright from the lower case 220 is passed through the hole portion 41-1, which is provided between the screw holes 35-1, 35-2 in the left-right direction LR as an elongate hole which is elongated in the left-right direction LR. The engagement of the hole portion 41-1 with the corresponding pin 221 restricts a movement of the second reinforcement member 320 in the front-back direction FB to thereby position the second reinforcement member 320 in the relevant direction, while allowing the second reinforcement member 320 to move in the left-right direction LR.

Three screw holes 36-1 to 36-3 are provided in the upper horizontal plate 323*b* of the fixing portion 323 in such a manner as to be aligned in the front-back direction FB. The front and back screw holes 36-1, 36-3 are formed into elongate holes which are elongated in the left-right direction LR. The screw hole 36-2 lying between the front and back screw holes 36-1, 36-3 is formed into a circular hole. A screw hole 36-4 is provided in the lower horizontal plate 323*c* of the fixing portion 323 and is formed into a circular hole.

Figure 6:
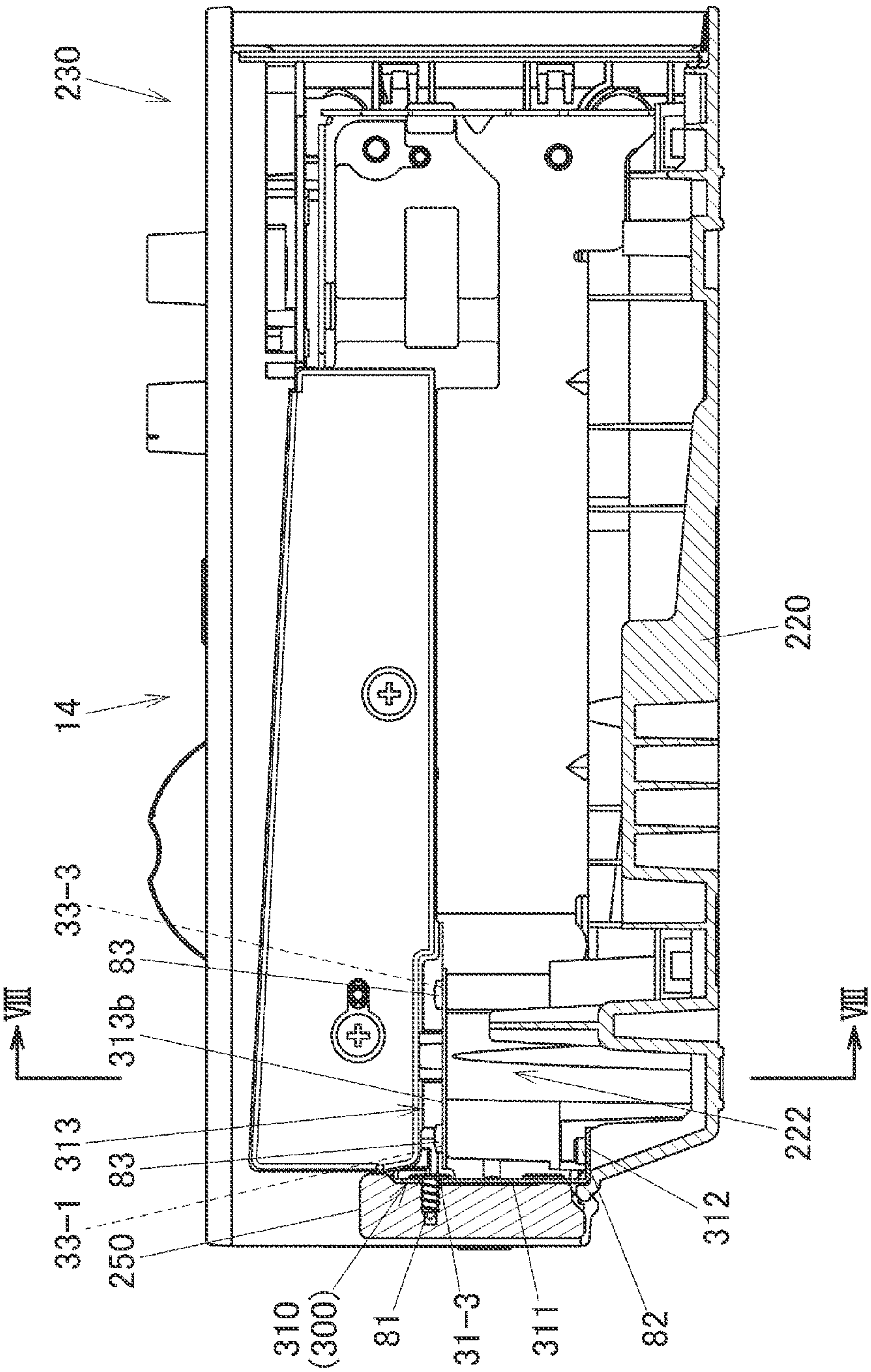
FIG. 6 is a sectional view of the case according to the embodiment of the present disclosure, which is taken along a line VI-VI in FIG. 2A.
Figure 7:
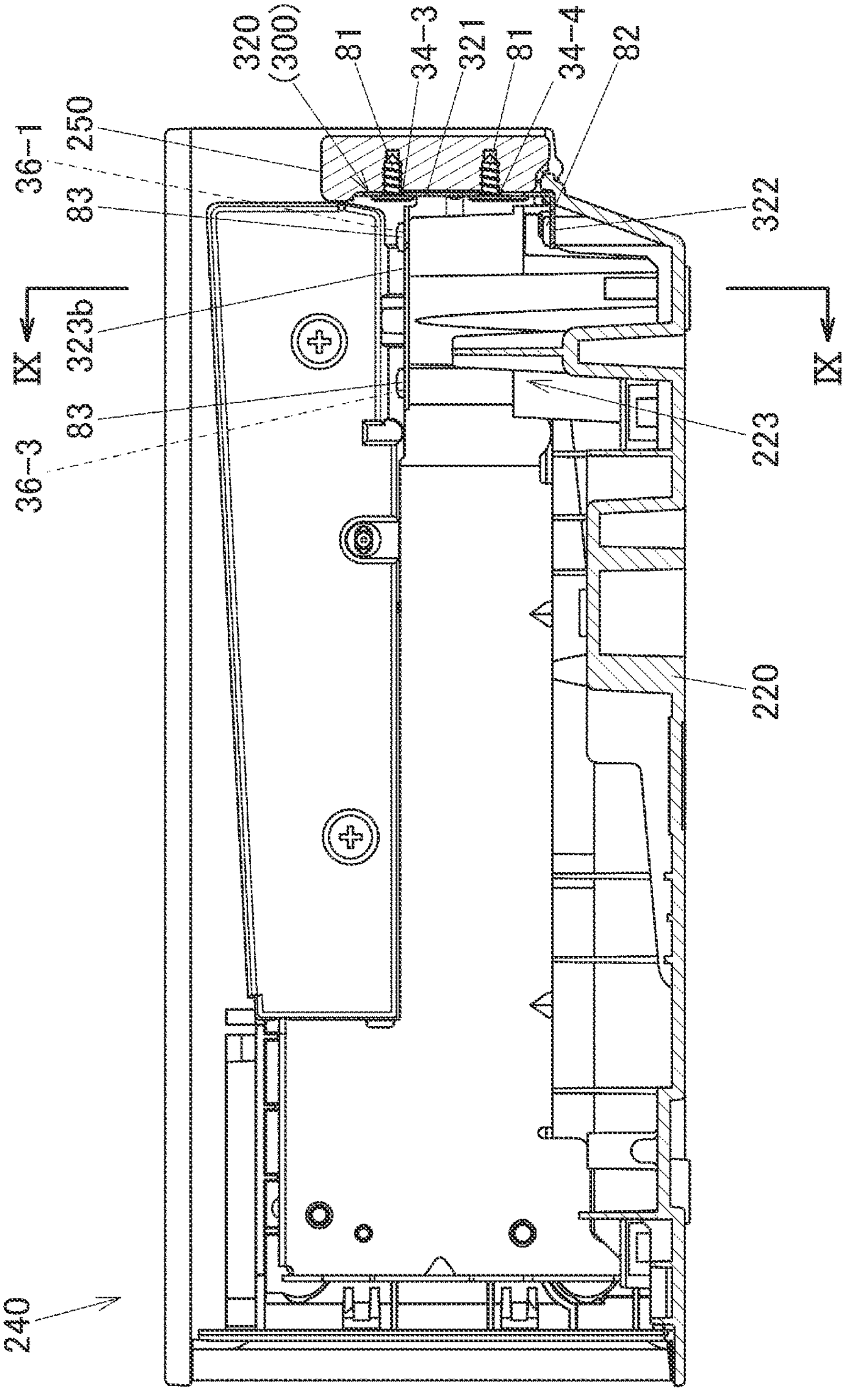
FIG. 7 is a sectional view of the case according to the embodiment of the present disclosure, which is taken along a line VII-VII in FIG. 2A.

An attachment relationship between the reinforcement members 300 (the first reinforcement member 310, the second reinforcement member 320), and the front case 250 and the lower case 220 will be described. As shown in FIGS. 6 and 7 in which the reinforcement members 300 (the first and second reinforcement members 310, 320), the front case 250, and the lower case 220 are shown in section, an upper end of the front case 250 projects towards the back side B, and the front plates 311, 321 of the reinforcement members 300 (the first reinforcement member 310, the second reinforcement member 320) are attached to the front case 250 in such a manner that the front plates 311, 321 are joined to the front case 250 in a face-to-face fashion below the upper end of the front case 250. In addition, a lower end of the front case 250 is provided in a step-like fashion.

As shown in FIGS. 2A to 2E (in particular, views (FIGS. 2B, 2D, 2E) of circled portions Q1, Q3, Q4), the screw members 81, which are wood screws, are passed through the screw holes 31-1 to 31-12 in the front plate 311 of the first reinforcement member 310 and the screw holes 34-1 to 34-4 in the front plate 321 of the second reinforcement member 320 so as to be tightly screwed into the front case 250 for fastening. In addition, the screw members 82, which are machine screws, are passed through the screw holes 32-1 to 32-10 in the lower plate 312 of the first reinforcement member 310 and the screw holes 35-1, 35-2 in the lower plate 322 of the second reinforcement member 320 so as to be screwed into internally threaded portions which are provided correspondingly to the screw holes 32-1 to 32-10 and 35-1, 35-2 in the lower case 220 for attachment.

As shown in the view (FIG. 2B) of the circled portion Q1 in FIG. 2A, a concave engagement target recessed portion 251 (a first recessed portion) is provided on the front case 250 in such a manner as to be elongated in the left-right direction LR so as to correspond in position and shape to the engagement piece 311*c* of the first reinforcement member 310. The engagement target recessed portion 251 is sized slightly larger widthwise (in the upper-lower direction UL) than a width of the engagement piece 311*c*. As a result, the engagement of the engagement piece 311*c* with the engagement target recessed portion 251 allows for a movement of the engagement piece 311*c* in the left-right direction LR and restricts a movement of the engagement piece 311*c* in the upper-lower direction UL. Thus, the front case 250 is positioned in place with respect to the first reinforcement member 310 in the upper-lower direction UL, while the engagement piece 311*c* is allowed to move in the left-right direction LR.

As shown in a view (FIG. 2C) of a circled portion Q2 in FIG. 2A, a substantially rectangular concave engagement target recessed portion 252 (a second recessed portion) is provided on the front case 250 in such a manner as to correspond to the engagement piece 311*b* of the first reinforcement member 310. In addition, as shown in FIG. 10, a flat surface at a left end of the front case 250 comes into abutment with the projections 311*d* and the projecting piece 311*f* of the front plate 311. The front case 250 is positioned with respect to the first reinforcement member 310 in the left-right direction LR by the projections 311*d*. In attaching the front case 250 to the first reinforcement member 310, the left end of the front case 250 is brought into abutment with the projections 311*d*, and the engagement target recessed portion 252 is pushed onto the engagement piece 311*b*, whereby the inclined portion 311*b*1 of the engagement piece 311*b* bites into a wall surface of the engagement target recessed portion 252 which faces the inclined portion 311*b*1. In this way, the front case 250 is not only positioned with respect to the first reinforcement member 310 but also is restricted from moving easily with respect to the first reinforcement member 310.

As shown in the view (FIG. 2E) of the circled portion Q4 in FIG. 2A, a concave engagement target recessed portion 253 (a first recessed portion) is provided on the front case 250 in such a manner as to be elongated in the left-right direction LR so as to correspond to the engagement piece 321*c* of the second reinforcement member 320. The engagement target recessed portion 25 is sized slightly larger widthwise (the upper-lower direction UL) than a width of the engagement piece 321*c*. The engagement of the engagement piece 321*c* with the engagement target recessed portion 253 allows for a movement of the engagement piece 321*c* in the left-right direction LR and restricts a movement of the engagement piece 321*c* in the upper-lower direction UL. As a result, the front case 250 is positioned with respect to the second reinforcement member 320 in the upper-lower direction UL.

As shown in the view (FIG. 2D) of the circled portion Q3 in FIG. 2A, a substantially rectangular concave engagement target recessed portion 254(a second recessed portion) is provided on the front case 250 in such a manner as to correspond to the engagement piece 321*b* of the second reinforcement member 320. In addition, as shown in FIG. 11, a flat surface at a right end of the front case 250 comes into abutment with the projections 321*d* and the projecting piece 321*f* of the front plate 321. The front case 250 is positioned with respect to the second reinforcement member 320 in the left-right direction LR by the projections 321*d*. In attaching the front case 250 to the second reinforcement member 320, the right end of the front case 250 is brought into abutment with the projections 321*d*, and the engagement target recessed portion 252 is pushed onto the engagement piece 321*b*, whereby the inclined portion 321*b*1 of the engagement piece 321*b* bites into a wall surface of the engagement target recessed portion 254 which faces the inclined portion 321*b*1. In this way, the front case 250 is not only positioned with respect to the second reinforcement member 320 but also is restricted from moving easily with respect to the second reinforcement member 320.

In addition, as shown in the view (FIG. 2D) of the circled portion Q3 in FIG. 2A, the respective engagement pieces 311*a*, 321*a* of the first reinforcement member 310 and the second reinforcement member 320 are both brought into engagement with an engagement target recessed portion 255 (a first recessed portion) which is provided on the front case 250 in such a manner as to be elongated in the left-right direction LR so as to correspond to the engagement pieces 311*a*, 321*a*. A size in the upper-lower direction UL of the engagement target recessed portion 255 is made slightly larger than a size (width) in the upper-lower direction UL of the engagement pieces 311*a*, 321*a*. As a result, the front case 250 is positioned with respect to the first reinforcement member 310 and the second reinforcement member 320 in the upper-lower direction UL.

A right end of the first reinforcement member 310 and a left end of the second reinforcement member 320 constitute a dividing position where the reinforcement members 300 are divided, and a predetermined gap is defined between the right end of the first reinforcement member 310 and the left end of the second reinforcement member 320. A gap S1 defined between the front plates 311, 321 and a gap S2 defined between the lower plates 312, 322 are offset in the left-right direction LR.

Figure 8:
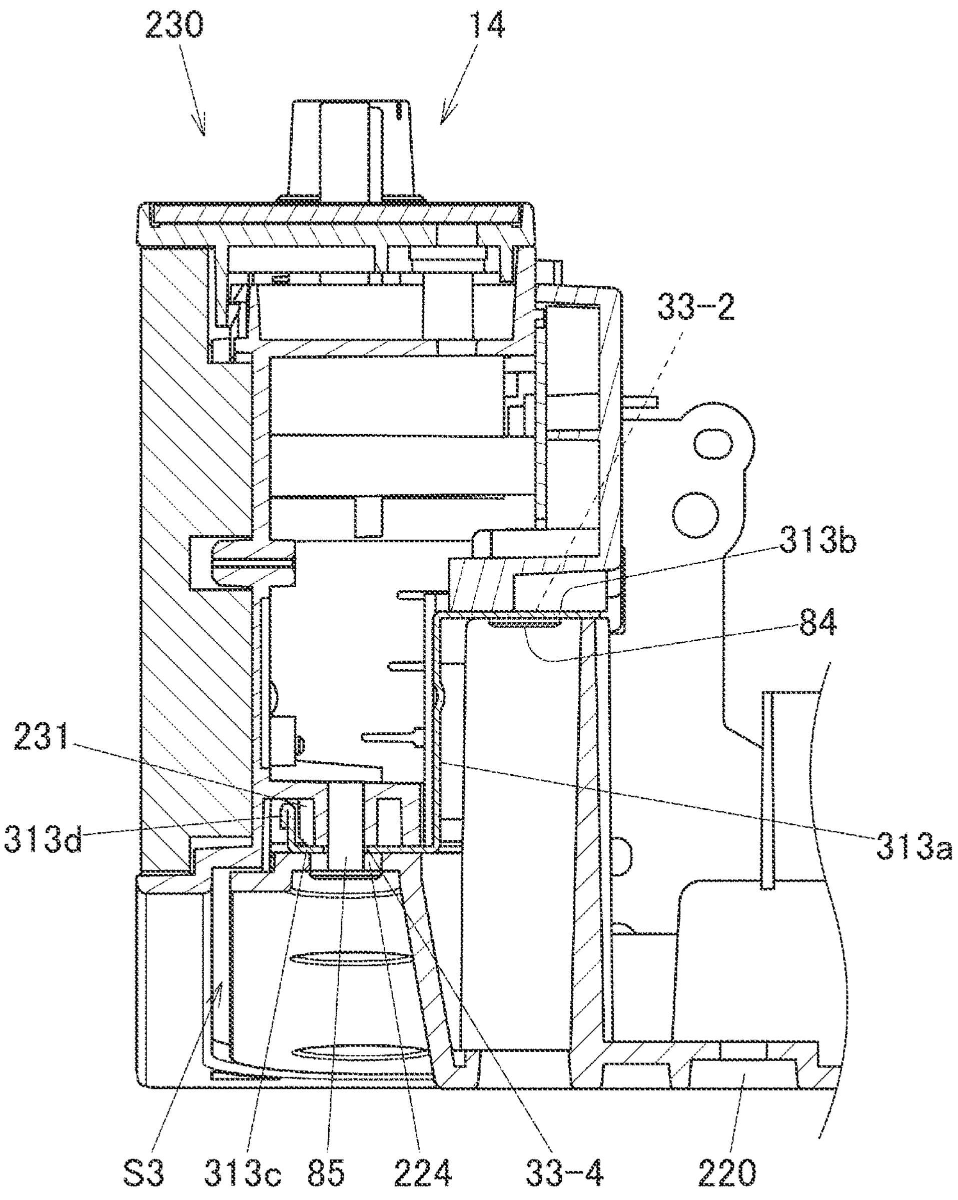
FIG. 8 is a sectional view of the case according to the embodiment of the present disclosure, which is taken along a line VIII-VIII in FIG. 6.

As shown in FIG. 6, screw members 83 are passed through the front and back screw holes 33-1, 33-3 (refer to FIG. 4A) and are then screwed into corresponding internally threaded portions which are provided in a boss 222 set upright from the lower case 220, whereby the upper horizontal plate 313*b* of the fixing portion 313 of the first reinforcement member 310 is fixed to the lower case 220. On the other hand, as shown in FIG. 8, a screw member 84 is passed through the screw hole 33-2, which is disposed between the front and back screw holes 33-1, 33-3 in the upper horizontal plate 313*b*, from the lower side Lo and is then screwed into a member making up the left side case 230, whereby the upper horizontal plate 313*b* is fixed to the left side case 230. In addition, a screw member 85 is passed through the screw hole 33-4 in the lower horizontal plate 313*c* from the lower side Lo via the lower case 220 and is then screwed into a member making up the left side case 230, whereby the lower horizontal plate 313*c* is fixed to the left side case 230. In this way, the left side case 230 is fixed to one end of the first reinforcement member 310. A hole portion 224 in the lower case 220 through which the screw member 85 is passed is formed into an elongate hole which is elongated long in the left-right direction LR. An inner surface (a surface facing the right side R) of the projecting piece 313*d* of the lower horizontal plate 313*c* comes close to or into contact with a projection 231, which is provided on the left side case 230 in such a manner as to project towards the lower side Lo, whereby the first reinforcement 310 is positioned with respect to the left side case 230 in the left-right direction LR.

Figure 9:
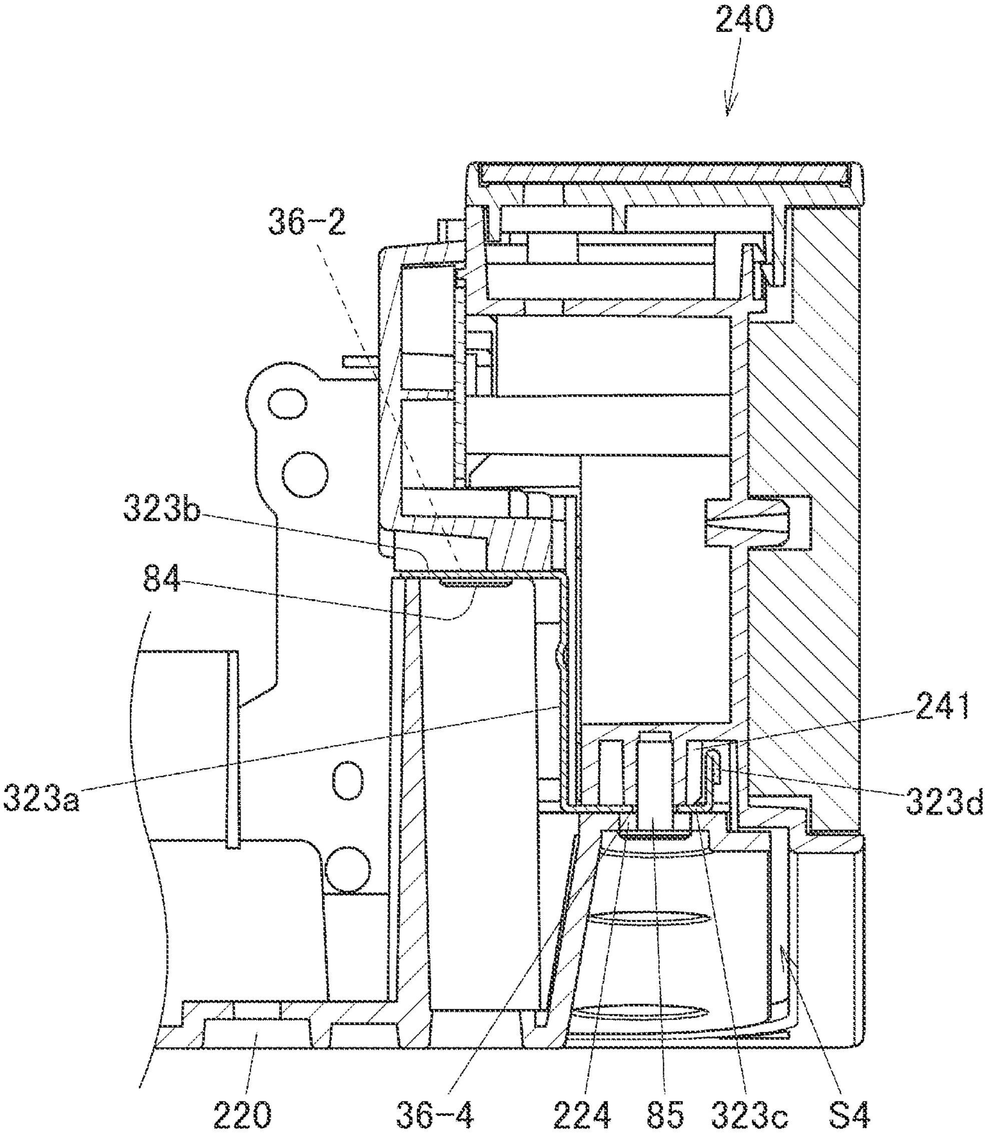
FIG. 9 is a sectional view of the case according to the embodiment of the present disclosure, which is taken along a line IX-IX in FIG. 7.

As shown in FIG. 7, screw members 83 are passed individually through the front and back screw holes 36-1, 36-3 (refer to FIG. 4A) and are then screwed into corresponding internally threaded portions which are provided in a boss 223 set upright from the lower case 220, whereby the upper horizontal plate 323*b* of the fixing portion 323 of the second reinforcement member 320 is fixed to the lower case 220. On the other hand, as shown in FIG. 9, a screw member 84 is passed through the screw hole 36-2, which is disposed between the front and back screw holes 36-1, 36-3 in the upper horizontal plate 323*b*, from the lower side Lo and is then screwed into a member making up the right side case 240, whereby the upper horizontal plate 323*b* is fixed to the right side case 240. In addition, a screw member 85 is passed through the screw hole 33-4 in the lower horizontal plate 323*c* from the lower side Lo and is then screwed into a member making up the right side case 240, whereby the lower horizontal plate 323*c* is fixed to the right side case 240. In this way, the right side case 240 is fixed to one end of the second reinforcement member 320. A hole portion 224 in the lower case 220 through which the screw member 85 is passed is formed into an elongate hole which is elongated in the left-right direction LR. An inner surface (a surface facing the left side L) of the projecting piece 323*d* of the lower horizontal plate 323*c* comes close to or into contact with a projection 241, which is provided on the right side case 240 in such a manner as to project towards the lower side Lo, whereby the second reinforcement 320 is positioned with respect to the right side case 240 in the left-right direction LR.

A relationship will be described below which will be established between the reinforcement members 300 and the front case 250, the lower case 220, and the side cases to deal with an expansion(or extension) and a contraction of the lower case 220 and the front case 250 as the outside air temperatures change. For example, when the outside air temperatures rise, the lower case 220, which is made from the resin material, expands, while the front case 250, which is made of the wood member, contracts due to a drop in humidity which follows the rise in the outside air temperatures. When the outside air temperatures lower, the lower case 220 contracts, while the front case 250 expands. On the other hand, the expansion and the contraction of the reinforcement members 300 (the first reinforcement member 310, the second reinforcement member 320) is sufficiently small compared with the lower case 220 and the front case 250 for a normal change in outside air temperatures because the reinforcement members 300 are made of the sheet metal members.

The fixing portions 313, 323 of the reinforcement members 300 (the first reinforcement member 310, the second reinforcement member 320) are fixed to the corresponding side cases (the left side case 230, the right side case 240) via the circular screw holes 33-2, 33-4, 36-2, 36-4. As a result, the first reinforcement member 310 and the second reinforcement member 320 are fixed to the corresponding side cases (the left side case 230, the right side case 240) so as to be restricted from moving relative to the relevant side cases.

In the first reinforcement member 310, the engagement piece 311*b* having the inclined portion 311*b*1 is disposed closer to the left side case 230 than the elongate screw hole 31-3 which lies nearest to the left side case 230. Further, the first reinforcement member 310 and the front case 250 are fixed to each other via the circular screw holes 31-1, 31-2 at a portion of the first reinforcement member 310 which lies closer to the left side case 230 than the engagement piece 311*b*. As a result, the first reinforcement member 310 and the front case 250 are fixed together so as not to allow for a relative movement at the portion in the vicinity of the left side end portion of the front case 250. That is, a gap defined between the front case 250 and the left side case 230 does not change even though the front case 250 expands or contracts. On the other hand, the first reinforcement member 310 and the front case 250 are fixed to each other via the elongate screw holes 31-3 to 31-12 at a portion of the first reinforcement member 310 which lies closer to an inner side (the right side R) than the engagement piece 311*b*, as a result of which, as will be described later, the first reinforcement member 310 and the front case 250 are fixed together so as to allow for a relative movement.

Similarly, also in the second reinforcement member 320, the engagement piece 321*b* having the inclined portion 321*b*1 is disposed closer to the right side case 240 than the elongate screw holes 34-3, 34-4 which lie nearest to the right side case 240. As a result, a gap defined between the right side case 240 and the front case 250 does not change. That is, the second reinforcement member 320 and the front case 250 are fixed to each other so as to restrict a relative movement at a portion of the second reinforcement member 320 which lies in the vicinity of the right side end portion of the front case 250, while the second reinforcement member 320 and the front case 250 are fixed to each other so as to allow for a relative movement at a portion of the second reinforcement member 320 which lies closer to an inner side (the left side L) than the engagement piece 321*b*.

On the other hand, the reinforcement members 300 (the first reinforcement member 310, the second reinforcement member 320) are fixed to the lower case 220 via the elongate screw holes 32-1 to 32-10, 35-1, 35-2. The reinforcement members 300 (the first reinforcement member 310, the second reinforcement member 320) are fixed to the lower case 220 via the elongate screw holes 33-1, 33-3, 36-1, 36-3 also at the fixing portions 313, 323. As a result, the reinforcement members 300 (the first reinforcement member 310, the second reinforcement member 320) are allowed to move relative to the lower case 220. That is, when the lower case 220 expands or contracts due to a change in outside air temperatures, lower surfaces of head portions of the screw members 82 which are installed in the elongate screw holes 32-1 to 32-10, 35-1, 35-2, 33-1, 33-3, 36-1, 36-3 slide over surfaces of the lower plates 312, 322, the upper horizontal plates 313*b*, 323*b*, and the lower horizontal plates 313*c*, 323*c*, whereby the reinforcement members 300 (the first reinforcement member 310, the second reinforcement member 320) are allowed to move relative to the lower case 220.

Similarly, flange portions of head portions of the screw members 81 slide over the front plates 311, 321 at the portions where the reinforcement members 300 (the first reinforcement member 310, the second reinforcement member 320) are fixed to the front case 250 via the elongate screw holes 31-3 o 31-12, 34-3, 34-4 in the front plates 311, 321.

Consequently, for example, when the outside air temperatures rise, causing the front case 250 to contract, the left side case 230 and the first reinforcement member 310 move to the right side R, and the right side case 240 and the second reinforcement member 320 move to the left side L. Then, the predetermined gaps S1, S2 decrease which are defined at the dividing portion where the first reinforcement member 310 and the second reinforcement member 320 are divided. In addition, as this occurs, although the lower case 220 extends in the left-right direction LR, since the first reinforcement member 310 and the second reinforcement member 320 are allowed to move relative to the lower case 220, there is generated no forced strain in the lower case 220. When the outside air temperatures lower, the relevant members expand or contact reversely to what is described above.

Thus, the gaps between the left and right ends of the front case 250 and the side cases (the left side case 230, the right side case 240) remain constant at all times even the outside air temperatures change. As a result, the gaps between the front case 250 and the side cases, which constitute portions visible from the player, do not change, thereby making it possible to secure a high aesthetic design.

The lower case 220 and the side cases (the left side case 230, the right side case 240) are connected together via the elongate screw holes (for example, the hole portion 224) which are elongated in the left-right direction LR, and predetermined gaps S3, S4 are provided between the lower case 220 and the side cases (the left side case 230, the right side case 240) in a lower surface of the case 200, whereby the side cases (the left side case 230, the right side case 240) are not restricted from moving by the lower case 220. In addition, since the gaps S3, S4 are provided in the lower surface of the case 200, there is caused no risk of the player happening to see those gaps.

In addition, a substantially central portion in the left-right direction LR of the case 200 is affected little by the expansion or contraction of the lower case 220 and the front case 250, as a result of which the screw hole 32-6 (disposed in the lower plate 312 of the first reinforcement member 310) in the position corresponding to the relevant central portion is formed shorter in length in the left-right direction LR than the other screw holes disposed in the other positions in the lower plate 312. Similarly, the hole portion 40-3 is formed into a circular hole.

The dividing position (the view (FIG. 2D) of the circled portion Q3 in FIG. 2A) of the reinforcement members 300 is disposed closer to the right side R so as to avoid the substantially central portion in the left-right direction LR of the case 200, whereby the rigidity at the substantially central portion in the left-right direction LR of the case 200 is enhanced. In addition, since the left side case 230 on which the control section 14 is disposed becomes heavier in weight than the right side case 240 on which no control section or the like is disposed, the rigidity of the left side case 230, which is heavier in weight, can be enhanced by disposing the dividing position of the reinforcement members 300 closer to the right side R in the case 200.

Although not shown, by dividing the back panel as required in the left-right direction LR, the lower case 220 and the back panel are prevented from imposing any influence on the behaviors of the front case 250, the side cases (the left side case 230, the right side case 240), and the lower case 220.

Thus, in the embodiment of the present disclosure, the case 200 includes the lower case 220 made from the resin material which constitutes the first material and extended to be long in the left-right direction LR which is the one direction, the plural reinforcement members 300 (the first reinforcement member 310, the second reinforcement member 320) fixed to the lower case 220, made from the sheet of steel which constitutes the second material whose linear expansion coefficient is smaller than the linear expansion coefficient of the first material (the resin material) and disposed while being divided in the left-right direction LR, the front case 250 formed in such a manner as to be long in the one direction and fixed to the plural reinforcement members 300 in such a manner as to span the reinforcement members 300, and the side cases (the left side case 230, the right side case 240) disposed adjacent to the front case 250 and fixed to the ends of the reinforcement members 300.

By adopting the configuration described above, even though the front case 250 and the lower case 220 expand or contract differently in amount due to the different linear expansion coefficients thereof as the outside air temperatures change, the divided reinforcement members 300 move in synchronism with the side cases and the front case 250, and the gaps defined between the side cases and the front case 250 remain constant. Thus, even though parts of different materials like the front case 250 and the lower case 220 are assembled together, there is caused no risk of the external appearance being deteriorated or the constituent members being damaged.

In addition, the plural reinforcement members 300 are divided asymmetrically. As a result, the dividing position can be set in accordance with a desired reinforcement target location.

The reinforcement members 300 in the plural reinforcement members 300 which are disposed at the end portions in the one direction, that is, the first reinforcement member 310 and the second reinforcement member 320 in the present embodiment in which the reinforcement members are divided into the two members are fixed to the front case 250 and the side cases in such a manner as to restrict the relative movement and are fixed to the lower case 220 in such a manner as to allow for the relative movement. Specifically speaking, the circular screw holes are provided at the portions at which the relative movement is restricted, and the elongate screw holes are provided at the portions at which the reinforcement members are fixed in such a manner as to allow for the relative movement. As a result, the side cases are allowed to move in synchronism with the reinforcement members 300 which are disposed at the end portions as the front case 250 expands (or extends) or contracts.

In addition, the reinforcement members 300 disposed at the end portions in the one direction include the circular screw holes 31-1, 31-2, 34-1, 34-2, 33-2, 33-4, 36-2, 36-4 through which the screw members are passed for the reinforcement members 300 to be fixed to the front case 250 and the side cases, the elongate screw holes 31-3 to 31-12, 34-3, 34-4 through which the screw members are passed for the reinforcement members 300 to be fixed to the front case 250, and the elongate screw holes 32-1 to 32-10, 35-1, 35-2 through which the screw members are passed for the reinforcement member 300 to be fixed to the lower case 220. As a result, the relative movement can be restricted or allowed with the simple configuration.

In addition, the reinforcement members 300 have the first projecting portions (the engagement pieces 311*a*, 311*c*, 321*a*, 321*c*) of the tongue piece shape, and the front case 250 have the first recessed portions (the engagement target recessed portions 251, 255, 253) which are brought into engagement with the first projecting portions. The engagement of the first projecting portions with the first recessed portions restricts the movement of the first projecting portions in the direction (the upper-lower direction UL) which is at right angles to the one direction (the left-right direction LR) and allows for the movement of the first projecting portions in the one direction (the left-right direction LR). As a result, the reinforcement members 300 can deal properly with expansion or contraction in the left-right direction LR of the front case 250 which is triggered by a change in outside air temperatures while the reinforcement members 300 and the front case 250 can be positioned with respect to each other in the upper-lower direction UL.

The reinforcement members 300 have the tongue piece-shaped second projecting portions (the engagement pieces 311*b*, 321*b*) including the inclined portions 311*b*1, 321*b*1 on the sides of the side cases to which the reinforcement members 300 are fixed, and the front case 250 has the second recessed portions (the engagement target recessed portions 252, 254) which are brought into engagement with the second projecting portions. As a result, the reinforcement members 300 can be positioned in the left-right direction LR at the portions in the vicinity of both the end portions of the front case 250 together with the circular screw holes 31-1, 31-2, 34-1, 34-2.

In addition, the reinforcement members 300 include the abutment projections (the projections 311*d*, 321*d*) which are brought into abutment with the end faces in the one direction of the front case 250. As a result, the positioning of the front case 250 with respect to the reinforcement members 300 can be facilitated.

Then, the keyboard instrument 10 includes the case 200. As a result, the keyboard instrument 10 can be provided which reduces the risk of the external appearance being deteriorated or the constituent members being damaged due to a change in outside air temperatures even though the members of the different materials are assembled together.

In the description that has been made heretofore, while the present disclosure has been described based on the relative movements triggered by a change in outside air temperatures to happen among the reinforcement members 300, the front case 250, the lower case 220, and the side cases (the left side case 230, the right side case 240), the present disclosure can also reduce the risk of the external appearance being deteriorated or the constituent members being damaged by a change in external environments (for example, humidity) other than outside air temperatures.

In addition, in the case 200 of the present disclosure, the lower case 220 is formed from the resin material which constitutes the first material, and the front case 250 is formed from the wood member which constitutes the third material. The reason that this configuration is adopted is that in the case that both the lower case 220 and the front case 250 are formed from wood members, it will be difficult to realize a reduction in weight and cost of the case 200, while in the case that both the lower case 220 and the front case 250 are formed from plastics, there will be caused a risk of the quality of the case 200 being deteriorated. Thus, it is preferable that the lower case 220 to which any attention is hardly paid is formed from the resin material, while the front case 250 to which much attention is paid easily is formed from the wood member.

In the existing techniques, in many cases, the front case 250 and the side cases (the left side case 230, the right side case 240) are fixed to the lower case 220. In this case, when the front case 250 formed from the wood member expands and the lower case 220 formed from the resin material contracts as a result of a change in external environments (for example, a drop in outside air temperatures), the side cases (the left side case 230, the right side case 240) are pushed out laterally in the left-right direction LR. Thereafter, when the front case 250 contracts and the lower case 220 expands as the external environments change further, the lateral end positions of the keyboard 5 are not restored to the original positions thereof because the side cases and the front case are not connected directly to each other, whereby a gap is produced between the side cases and the front case to such an extent that the side cases are pushed out laterally. When the front frame and the lateral end of the keyboard 5 are attempted to be connected directly to each other by fastening them together by driving a screw in a lateral direction to solve the problem described above, the opposite lateral end of the keyboard 5 constitutes an obstacle, making the operation difficult to be executed. Then, when attempting to drive a screw in the lateral direction from an outside, a head of the screw so driven becomes visible from the outside. The present disclosure can provide the keyboard instrument 10 which can reduce the risk of the external appearance being deteriorated which would otherwise be the case when the outside air temperatures change even though the members of the different materials are assembled together, and which can be built up without any difficulty.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. An instrument case comprising:
a lower case formed from a first material and extending in a left-right direction;
a front case extending in the left-right direction;
side cases disposed on respective ends of the front case in the left-right direction; and
first and second reinforcement members:
made from a second material whose thermal expansion coefficient is smaller than a thermal expansion coefficient of the first material;
disposed adjacent to one another in the left-right direction;
fixed to respective side cases of the side cases and respective portions of the front case so as to restrict relative movements between the respective side cases and the respective portions of the front case; and
fixed to the lower case and respective non-end portions of the front case so as to allow relative movements between the first and second reinforcement members and the lower case and between the first and second reinforcement members and the respective non-end portions of the front case.

2. The instrument case according to claim 1, wherein the first and second reinforcement members have unequal lengths in the left-right direction.

3. The instrument case according to claim 1, wherein the first and second reinforcement members are offset from one another in the left-right direction.

4. The instrument case according to claim 1, wherein the front case is formed from a third material whose thermal expansion coefficient is different than the thermal expansion coefficients of the first material and the second material.

5. The instrument case according to claim 1,
wherein the first material is a resin or a plastic, and
wherein the second material is a metal.

6. The instrument case according to claim 4,
wherein the first material is a resin or a plastic,
wherein the second material is a metal, and
wherein the third material is wood.

7. The instrument case according to claim 1,
wherein the first and second reinforcement members are fixed to the respective side cases and the respective portions of the front case via screws disposed through respective circular screw holes, and
wherein the first and second reinforcement members are fixed to the lower case and the respective non-end portions of the front case via screws disposed through respective elongated screw holes.

8. The instrument case according to claim 1,
wherein the first and second reinforcement members comprise respective first projecting portions having a shape of a tongue piece,
wherein the front case comprises first recessed portions configured to be brought into engagement with the first projecting portions, and
wherein engagements of the first projecting portions with the first recessed restrict movements of the first projecting portions in an up-low direction and allow for movements of the first projecting portions in the left-right direction.

9. The instrument case according to claim 8,
wherein the first and second reinforcement members comprise respective second projecting portions having a shape of a tongue piece, and
wherein the front case comprises second recessed portions configured to be brought into engagement with the second projecting portions.

10. The instrument case according to claim 9, wherein the second projecting portions have a substantially rectangular shape comprising an inclined portion facing a respective side case of the side cases.

11. The instrument case according to claim 1, wherein the first and second reinforcement members comprise respective abutment projections configured to be brought into abutment with respective end faces of the front case.

12. The instrument case according to claim 1, wherein the first and second reinforcement members are configured to move in opposite directions as the front case deforms.

13. The instrument case according to claim 1,
wherein the first and second reinforcement members comprise respective front plates having a width substantially equal to a width of the front case defined in an up-lo direction and respective lower plates bent from lower edges of the front plates towards a back side and having a width narrower than the width of the front case in the up-lo direction, and
wherein the first and second reinforcement members comprise respective first projecting portions that are disposed away from the portions of the front case, formed into a shape of a tongue piece, and extend towards a front side of the case.

14. The instrument case according to claim 13,
wherein the first and second reinforcement members comprise respective fixing portions that are disposed towards the portions of the front case and extend towards a back side of the case, and
wherein the fixing portions comprise respective vertical plates with a normal direction that is parallel with the left-right direction, respective upper horizontal plates attached to respective upper ends of the vertical plates with a normal direction that is parallel with the up-lo direction, and respective lower horizontal plates bent attached to respective lower ends of the vertical plates with a normal direction that is parallel with the up-lo direction.

15. An instrument comprising the instrument case according to claim 1.

* * * * *